United States Patent [19]

Szoeke

[11] 4,086,498

[45] Apr. 25, 1978

[54] WIND POWERED ROTARY ELECTRIC GENERATOR

[76] Inventor: Joseph Szoeke, 57 Portland Pl., Yonkers, N.Y. 10703

[21] Appl. No.: 571,732

[22] Filed: Apr. 25, 1975

[51] Int. Cl.² .................................... H02P 9/00
[52] U.S. Cl. .................................. 290/55; 415/2
[58] Field of Search .................... 415/1–15; 290/42–55

[56] References Cited

U.S. PATENT DOCUMENTS

| 756,372 | 4/1904 | Johnson | 415/2 |
| 833,184 | 10/1906 | Terzian | 290/55 |
| 1,186,289 | 6/1916 | Dalen | 290/55 X |
| 2,484,197 | 10/1949 | Ueldhuis | 290/44 |

Primary Examiner—Robert K. Schaefer
Assistant Examiner—John W. Redman

[57] ABSTRACT

A machine and method for converting the wind's linear force to electricity, comprising of a rotor, walled at both inner and periphery radiuses, encircled by a periphery deflector and its inner radius covered with a core deflector. Tapping means attached to the back planar base of its plurality of rotor vanes and rotably associated with plurality of reciprocating generators. Rotation speed and generating electricity regulated by operating means, mounted to its axis.

5 Claims, 9 Drawing Figures

U.S. Patent    April 25, 1978    Sheet 1 of 2    4,086,498
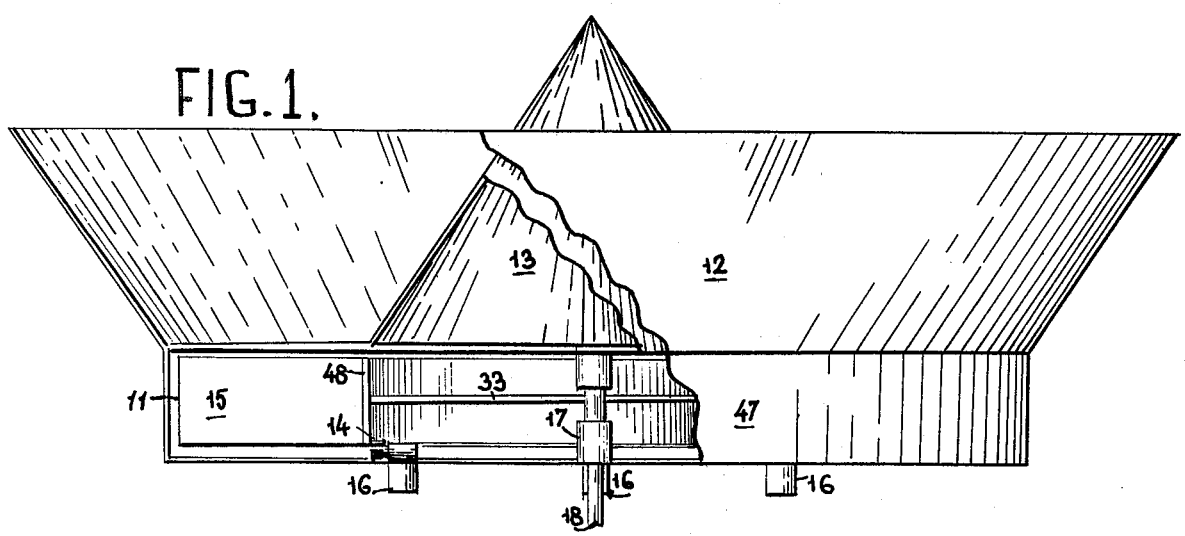
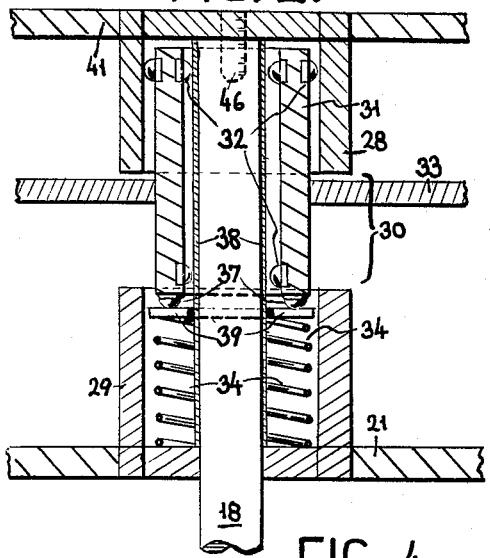
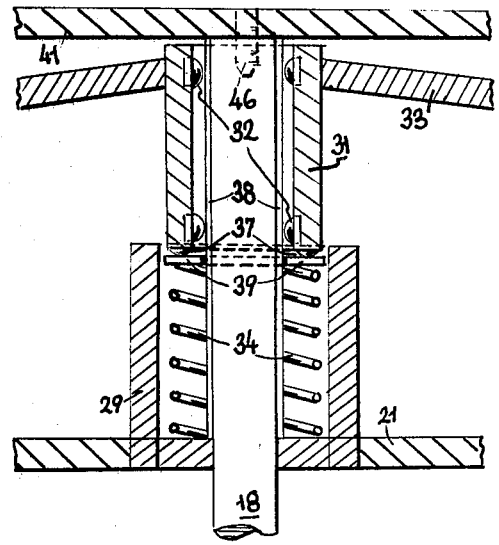
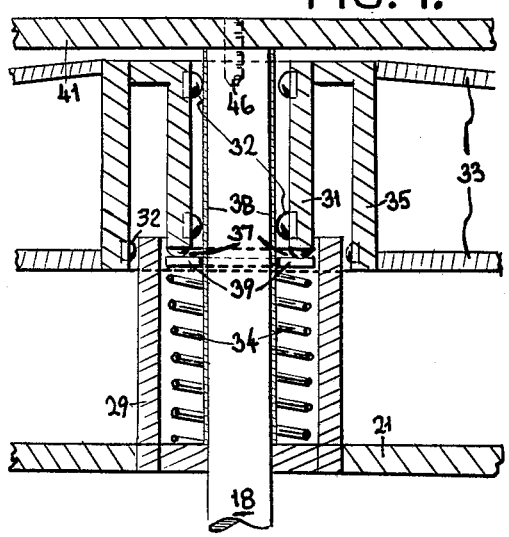

WIND POWERED ROTARY ELECTRIC GENERATOR

This invention relates to machines for generating electricity by converting the wind linear motion to circular motion, and more particularly to improvements in the wheel type multi vaned generators.

BACKGROUND OF THE INVENTION

It has been possible to convert the wind's linear motion to circular motion for hundreds of years. However, the prior art machines have not been proved entirely satisfactory. For example, all the known types had to be large and bulky in size to deliver commercially acceptable quantities of energy, wich apart from the expense of making such machines is one of the principal reasons why the aforementioned prior machines have not come more extensively into general use. Another disadvantage of the prior art machines has been the inadequacy to deliver the maximum energy available at various wind velocities. One such prior machine equipped with variable pitch vanes to reduce the impact surface pitch at higher wind velocities, other machines of the class have various type mechanical braking means, or means to reduce the impact surface area to desired level, at the expense of controlling rotation speed. Another disadvantage of prior art machines has been the small surface area utilized in conversion of the wind's energy in comparison to the size of such machines and space needed for operation.

FIELD OF THE INVENTION

It is the object of this invention to greatly reduce the overall size of machines of this nature, without loosing the capacity of generating commercially acceptable quantities of electricity. It is an other object to provide a machine of the class wich is capable to deliver the maximum energy available at various wind velocities. It is an other object to controll the rotation speed for such machines by generating more energy as the wind velocity increases. It is an other object of this invention to provide simple, inexpensive and novel features adaptable to presently operated wind powered generators, water pumps and like. Still an other object of this invention to extend the impact surface area for such machine and thus reduce the overall size of the machine of this nature.

A feature of this invention resides in the provision of new means and method of tapping or converting the rotor's circular motion to electricity. At least one tapping means attached to the base of the rotor's vanes provides the tapping or power transfering feature and plurality of reciprocating generators the converting means. Unlike prior art machines, this conversion takes place at the source of power, the rotor. A circular shaped tapping member attached to the inner circumference of the rotor and rotably associated to said plurality of generators. Said plurality of generators provides the converting, generating and rotor speed regulating means and method in this feature of the invention, comprises of plurality of housings, attached to main axis based radially extending plurality of rear support members and comprises of generators, provided for each housings. Each generator comprises of tapping heads, rotably associated to the tapping surface of said tapping means in operation, and attached to reciprocating means provided to allow some longitudinal reciprocating movements and for engagement and disengagement from said tapping means. A coil spring featured as reciprocating means in the drawings, however, is not limited to this particular means of reciprocating but covers all equivalents of similar devices accomplishing similar purposes. To regulate the rotation speed, the plurality of generators, when associated to said tapping means, utilized as brakes. Depending on the rotation speed desired, the energy needed to turn each generator, and the number of generators engaged, a wide range of wind velocities can be converted to electricity without loss for braking or regulating constant rotation speed by other means.

An other feature of this invention resides in the provision of new means and method of automatic regulation of the rotation speed in various wind velocities. Although the plurality of reciprocating generators provides the braking or "slowing down" effect, the operating means regulate the number of reciprocating generators engagement or disengagement to and from tapping rail. Said operating means encircling the hardened surface main axis, comprises of a reciprocating axle, rotating, moving and reciprocating means. The tubular shaped reciprocating axle provided with rotating and moving means, comprises of plurality of rings of ballbearings or other friction reducing devices, attached to its surface for rotation and longitudinal movements thereof, and with plurality of rotor support members. Reciprocating means, such as the coil spring featured in the drawings encircles the main axle in its housing and a circular shaped hollow core plate attached to its front end for rotation means rotating thereon.

An other feature of this invention resides in the provision of new means extending the machine's linear to circular converting surface by the provision of cone shaped core deflector and circular shaped periphery deflector attached to the core and periphery of said rotor respectively. Both deflectors provided with spiral grooves radially extending from the center of said machine and and the arms of said spiral grooves spirally extending from the center of said machine and terminating in the direction of the rotation movement of said rotor, to deflect the wind's linear motion and direct this deflected motion to the rotor's vanes.

Still an other feature of this invention resides in the provision of walled rotors, for more effective use of the available wind power, comprising of a wall attached to the ends of plurality of front and rear support members, encircling the periphery circumference of said rotor, and a wall attached to the inner ends of plurality of rotor vanes encompasing the inner circumference of said rotor, thus forming said walled rotors.

Several versions described in the prefered embodiments adaptable for prior art windmills, waterpumps and other wind powered machines by employing one or more features described here and shown in the drawings.

BRIEF DESCRIPTION OF THE DRAWINGS

FIG. 1. is a sideview partially broken away, of the wind powered rotary generator, according to the invention.

FIG. 2. is a sideview of one version of the operating means.

FIG. 3. is a sideview of a second version of the operating means.

FIG. 4. is a sideview of a third version of the operating means.

FIG. 5. is a sideview of a reciprocating generator and related components.

DESCRIPTION OF THE PREFERED EMBODIMENTS

Figure 6:
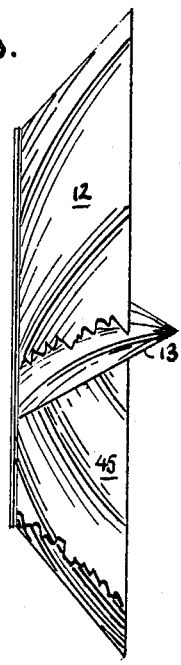
FIG. 6. is a sideview partially broken away, illustrating the plurality of grooves on periphery and core deflectors.
Figure 7:
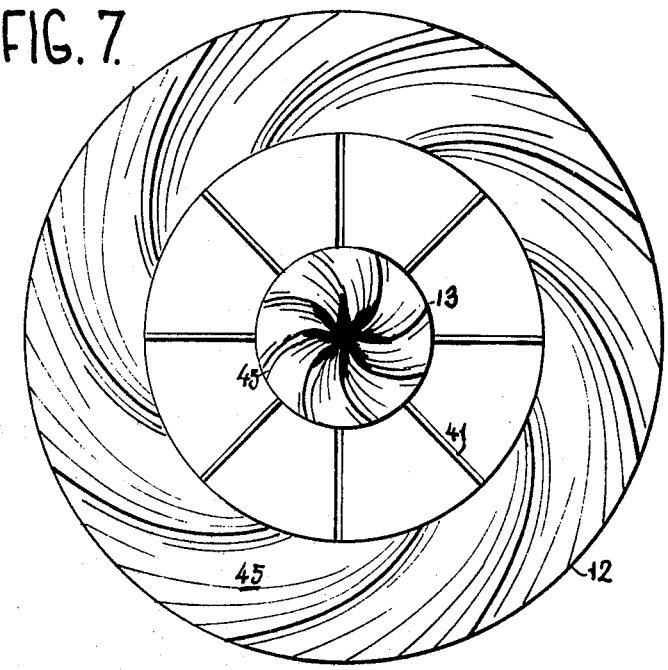
FIG. 7. is a plan view illustrating the plurality of grooves on periphery and core deflectors.
Figure 9:
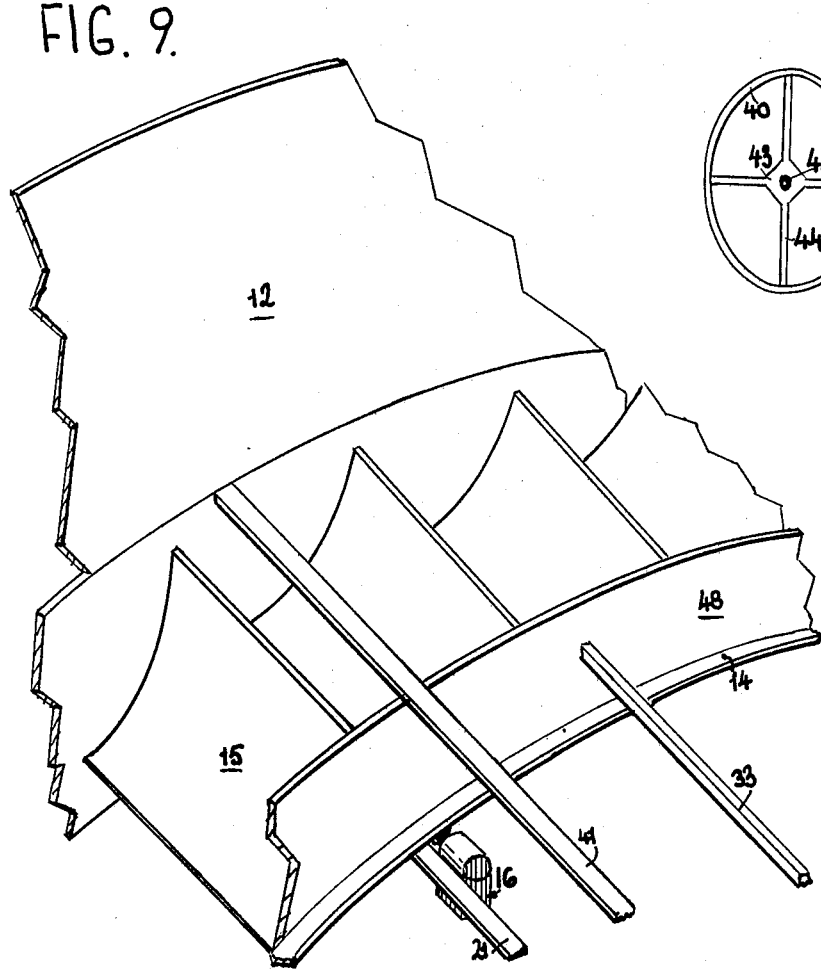
FIG. 9. is a perspective view, illustrating the walled rotor and the association between the tapping means and a reciprocating generator.
Figure 8:
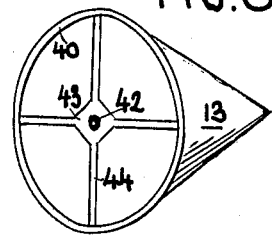
FIG. 8. is a rear perspective view of the core deflector.

In the illustrated embodiments of the invention the wind powered rotary generator comprises wholly or partially of the following components: A rotor 11, its outer periphery circumference encircled by a peripheral deflector 12, its inner circumference covered by a core deflector 13, tapping means 14 attached to the back portion of its plurality of vanes 15 rotably associated to plurality of generators 16, regulated by operating means 17 and rotably mounted to main axle 18.

One or more tapping means 14 may be mounted at any preferred distance from main axis 18, and in the preferred embodiments, only one mounted on the back planar base of the inner radius of plurality of vanes 15. Said tapping means being a flat, circular shaped ring, facing to a plurality of generators 16. This power transfering feature of the embodiments refered here as tapping means 14, provides the means to transfer the rotor's rotary motion to a plurality of reciprocating generators 16.

Said plurality of generators 16 provides the generating and rotation regulating means, attached to main axle 18 based radially diverging plurality of rear support members 21, comprises of a cylindrical shaped, gripping design surfaced tapping head 23, rotably associated with said tapping means 14 in operation. Each generating means 22 attached to reciprocating means 24 for some longitudinal reciprocating movements, and for engagements and disengagements from said tapping means 14. Each generating means 24 provided with two or more guiding means 25, attached to its base. A hollow chambered housing 26 provided for said reciprocating means 24, having two or more longitudinal grooves or channels 27 in its inner walls, to form tracks for the guiding means 25 longitudinal reciprocating movements.

The rotation speed regulated by the calculable factor of energy tapped from tapping means 14 at a given wind velocity and the calculable factor of energy needed to turn each reciprocating generator 16. If the energy tapped from said tapping means 14 is more than the energy needed to turn one reciprocating generator 16, the rotor's 11 rotation speed increases. To brake, or regulate this increased rotation speed, a second reciprocating generator 16 engages to said tapping means 14, when the rotation speed reaches a predetermined limit, and a third or more reciprocating generators engages when the energy tapped is higher than the energy needed to turn the given number of generators 16. Alternatively, when the energy level of the wind tapped decreases, one or more generator disengages, depending on the level of energy at the given moment. Each reciprocating generator 16 is set at different distance from the tapping means 14, and depending on this distance, engages or disengages at different pre-set energy levels. Each reciprocating generator's output may be the same, or of different caliber. To regulate, when each of said generator 16 is engaged, the operating means 17 is provided.

Operating means 17 provides the automatic regulating of the number of generators 16 engaged at various wind velocities by its reciprocating means longitudinally backwards movements gauged to pre-set energy levels, and provides the rotary association of tapping means 14 with one or more reciprocating generator 16, to generate predetermined amount of electricity at predetermined rotation speed.

FIG. 2 illustrates one version of said operating means 17, comprises of a cylindrical shaped housing, encircling the main axis 18, divided into front housing 28 and rear housing 29 by an aperture 30, and houses a tubular shaped reciprocating axle 31 and reciprocating means 34. Said reciprocating axle 31 having plurality of rotor support members 33, radially diverging through said apperture 30 to support said rotor 11, and rotating means 32, such as the ballbearings shown in the drawings encircles its inner and periphery surfaces, and rotating means 37 encircles its rear rim radius, and rotably associated with the hardened inner surfaces of front housing 28, and with the hardened surface slieve 38, encircling the main axis 18. Said rotating means 37 rotably associated to a ring shaped reciprocating ring 39, attached to reciprocating means 34, said reciprocating means 34 being a coil spring or other device functioning in similar manner, housed in the rear housing 29.

FIG. 3. illustrates a second version of said operating means 17, provided for longer longitudinal reciprocating movements, when the width of aperture 30 opening shown in FIG. 2. is not sufficient, and more space needed for proper gaps between each generating means 22 and tapping means 14, for example, when large number of generators 16 employed. This second version of operating means 17 comprises substantially the same components as the the first version, with the exceptions of the elimination of front housing 28, and the periphery rotating means 32, and, the plurality of rotor support members 33 attached to the front section of said reciprocating axle 31 instead of its center. Said plurality of rotor support members may diverge in an angle, as shown in drawings to rotor 11. Rear housing 29 may be extended beyond the hub of the plurality of rear support members 21 (not shown) to provide longer longitudinal reciprocating movements for said reciprocating axle 31.

FIG. 4. illustrates a third version of said operating means 17, provided for large rotors and better stability, comprises of a double walled reciprocating axle, having inner 31 and periphery 35 walls, jointed at its front end, said periphery axle wall 35 overlaps the back housing 29, and its rotating means 32 roably associated with the periphery surface of said back housing 29. Plurality of rotor support members 33 attached to both front and back ends of said periphery axle wall 35, and both front and back support members may diverge in a choosen angle to the rotor 11. Other components not cited here being substantially the same and functions in similar manner as described in preceding versions.

In all three versions of the operating means 17 described, the reciprocating means 34 longitudinal distances must be proportionately set to the number of generators 16 employed, and each reciprocating generator's reciprocating means 24 must be proportionate in strength to all generator's reciprocating means 24 employed, to arrive at a proportionate setting for various wind energy levels tapped. The energy needed for the total number of reciprocating means 24 to move longitudinally backwards a preset distance must be less than the energy needed to move the reciprocating means 34 of the operating means 17 longitudinally backwards the same distance in order to operatively associate with each generator 16, and therefore operate in various wind velocities.

Deflecting means, such as the core deflector 13 and periphery deflector 12, provided for more efficient use of the space available for the machine. Core deflector 13 utilizes the core space of the machine, from the center encompasing the inner circumference of said rotor 11, and, the periphery deflector 12 uses a predetermined width of space, ranging from 5 to 300 percent of the rotor's diameter in width, and encircling the periphery of said rotor 11. The core deflector 13 being conical in shape, having attaching means 40 at its base radius, secured to the plurality of front support members 41, and securing means 42 at its base center 43, where its base support members 44 converges, secured to front end 46 of main axle 18. Plurality of spiral grooves 45, each having a predetermined depth, begins at the top of the cone shaped core deflector 13 and spirally terminates at the inner circumference of said rotor 11, its spiral arms converges in the direction of said rotor's rotation direction. Periphery deflector 12 attached to the terminal ends of plurality of front 41 and support members, tilted in a forward angle, having predetermined depth for its plurality of spiral grooves 45, each spiral groove 45 begins at the periphery of its radius and spirally terminates at the periphery radius of said rotor's rotation direction. Both core 13 and periphery 12 deflectors provided for deflecting the wind's linear motion to a desired angle, and said plurality of grooves 45 on the deflectors, to guide the deflected wind force in to a spiral motion before entering to plurality of vanes 15 in an angle best utilized to turn rotor 11. Said angle of the core 13 and periphery 12 deflector walls can be set between 5° and 85° in relation to the planar base of said rotor 11.

Three versions of major combinations or embodiments of the provided elements will be described bellow now. One embodiment adaptable to prior art machines, comprises of periphery 12 and core 13 deflectors with or without spiral grooves 45, and the exterior 47 and interior 48 rotor walls optional.

The second embodiment, a wind powered rotary generator, employs the rotor 11, its periphery radius encircled by periphery deflector 12, its inner radius covered by core deflector 13, spiral grooves 45, exterior 47 and interior 48 rotor walls being optional, tapping means 14 attached to the back planar base of its plurality of vanes 15 rotably associated to plurality of reciprocating generators 16, regulated manually, or by prior art devices.

The third embodiment of the wind powered rotary generator comprises of the same elements as the second embodiment above, except it is regulated by operating means 17, provided in three versions, as described previously, and illustrated in FIGS.: 2, 3 and 4.

Various combinations in the three major embodiments are possible by adding or omitting certain elements of the machine, wich would make these combinations distinct from each other, without departing from the spirit of the invention. For example, in the first embodiment the provision or omission the spiral grooves on periphery 12 and core 13 deflectors, or the provision or omission of interior 48 and exterior 47 rotor walls and their subcombinations, such as:

deflecting means without spiral grooves 45, walled rotor omitted, deflecting means with spiral grooves 45, walled rotor omitted, deflecting means without spiral grooves 45, and walled rotor, deflecting means with spiral grooves 45, and walled rotor.

Same principle of adding or omitting certain elements possible in the second and third embodiments described above, to provide distinct combinations and subcombinations of the wind powered rotary generator.

In operation, the power for operating the machine supplied by the wind's linear force, collected and deflected by core 13 and periphery 12 deflectors, set to predetermined angles, and guided by plurality of grooves 45, to a spiral, rotation wise motion, before entering rotor 11. Walls provided at inner and periphery radius of the plurality of rotor vanes 15, to restrain and confine the wind entered to rotor 11, and to exert its full force to rotate it. Tapping the circular motion of the rotor 11 and converting it to electricity provided by the tapping means 14 association to generating means 22, regulated by operating means 17, by the inter action between its reciprocating means 34 and the reciprocating means 24 of plurality of generators 16. Generating electricity in various wind velocities comprises of spacing said generators at various distances from said tapping means 14, and, pre-setting said reciprocating means 34 of operating means 17 to each of plurality of generator's 16 reciprocating means 24, so that said rotor 11 and operating means 17 longitudinal reciprocating movements engages and disengages said plurality of generators 16 at predetermined energy levels. The regulating of rotation speed of the rotor 11 in various wind velocities comprises of utilizing the energy needed to turn each of plurality of generator 16 to stabilize the rotation speed at predetermined constant level, by engaging and disengaging the number of generators 16 needed at specific wind velocities.

The advantages of the invention are numerous and noteworthy. By providing the periphery and core deflectors in combination with the walled rotor, the size of the machine can be reduced substantially, without losing its generating capacity. With its reduced size, it is feasible to use not only commercially, but for individual dwellings as well, such as rooftop generators, to supplement or replace the commercially available electricity. Another advantage of the machine lies in the capability of generating the maximum available energy at any given wind velocity, without the loss for regulating rotation speed or reducing the work surfaces. Due to its reduced size, the possibility of reduced manufacturing costs and materials deserves mentioning here, and other advantages, such as adapting some or all of the disclosed features to present art devices increases the energy output of the given machine, to the benefit of its user.

Various modifications and changes may be made in the above described machine and its elements, without departing from the scope of the invention, some of the novel features of wich are defined in the appended claims.

What is claimed and desired to be secured by letters patent is:

1. A wind powered rotary electric generator, comprised of a rotor having a plurality of vanes and a back planar base ring comprising a tapping means mounted on a shaft provided with an axial movement,
   a wind deflecting means consisting of a conical shaped core wind deflector, its base circumference encompasing the inner circumference of said vanes and a peripheral wind deflector encircling said rotor at its outer peripheral circumference,
   a plurality of generators, each comprising a cylindrical shaped tapping head adapted to be driven by said base ring tapping means and an electrical generator, attached to a mounting means through a spring biased generator holding means, and,
   operating means, to engage and disengage said electrical generating means and said tapping by reciprocating movement of said rotor and tapping means.

2. A wind powered rotary electric generator as recited in claim 1, said wind deflecting means further comprising
   a plurality of spiral grooves, having predetermined depth, to guide the collected and deflected wind into a spiral rotation wise motion before entering said rotor in a predetermined angle, further comprising
   a plurality of core deflector spiral grooves, spirally diverging and terminating at the inner radius of said rotor, and,
   a plurality of periphery deflector spiral grooves spirally converging and terminating at the periphery radius of said rotor.

3. In a wind powered rotary electric generator the method of generating electricity comprising
   deflecting and directing wind to a rotor with a conical core deflector centered on the rotor with its apex pointing away from said rotor and a periphery wind deflector encircling said rotor,
   providing a circular means attached to a back planar base ring of said rotor comprising a tapping means mounted on a shaft provided with axial movement,
   providing a plurality of electric generators to be driven by said tapping means having cylindrically shaped tapping heads positioned at substantially the same level as said tapping means and,
   operating said plurality of generators by engaging and disengaging said tapping heads of said plurality of generators and said tapping means by controlling the axial movement of said tapping means.

4. In a wind powered rotary electric generator as recited in claim 3, the method of generating electricity further comprising
   guiding said deflected wind to spiral, rotation wise motion by a plurality of periphery deflector spiral grooves converging and terminating at the periphery circumference of said rotor, and,
   guiding said deflected wind to spiral, rotation wise direction by plurality of core deflector spiral grooves, diverging and terminating at the inner circumference of said rotor.

5. In a wind powered rotary electric generator as recited in claim 3, the method of generating electricity comprising
   providing said rotor with operating means for controlling longitudinal axial movement, and,
   presetting said operating means longitudinal movements to engage and disengage plurality of generators at predetermined rotation speed and energy levels.

* * * * *